(12) United States Patent
Huszar et al.

(10) Patent No.: US 10,685,264 B2
(45) Date of Patent: Jun. 16, 2020

(54) VISUAL DATA PROCESSING USING ENERGY NETWORKS

(71) Applicant: Magic Pony Technology Limited, London (GB)

(72) Inventors: Ferenc Huszar, London (GB); Robert David Bishop, London (GB); Zehan Wang, London (GB)

(73) Assignee: Magic Pony Technology Limited, London (GB)

( * ) Notice: Subject to any disclaimer, the term of this patent is extended or adjusted under 35 U.S.C. 154(b) by 0 days.

(21) Appl. No.: 15/855,807

(22) Filed: Dec. 27, 2017

(65) Prior Publication Data
US 2018/0121769 A1 May 3, 2018

Related U.S. Application Data

(63) Continuation of application No. PCT/GB2017/051008, filed on Apr. 11, 2017.

(30) Foreign Application Priority Data

Apr. 12, 2016 (GB) .................................. 1606298.6

(51) Int. Cl.
*G06K 9/36* (2006.01)
*G06K 9/66* (2006.01)
(Continued)

(52) U.S. Cl.
CPC .............. *G06K 9/66* (2013.01); *G06N 20/00* (2019.01); *G06T 5/002* (2013.01);
(Continued)

(58) Field of Classification Search
CPC .......... G06K 9/66; G06T 3/40; G06N 99/005; G06N 20/00
See application file for complete search history.

(56) References Cited

U.S. PATENT DOCUMENTS 5,638,125 A 6/1997 Ann et al.
5,673,213 A * 9/1997 Weigl ................. H03H 21/0012
708/322

(Continued)

FOREIGN PATENT DOCUMENTS

CN 101621683 A 1/2010
CN 102148996 A 8/2011
(Continued)

OTHER PUBLICATIONS

Search Report for Application No. GB1606298.6, dated Oct. 11, 2016, 3 pages.

(Continued)

*Primary Examiner* — Amir Alavi
(74) *Attorney, Agent, or Firm* — Brake Hughes Bellermann LLP

(57) ABSTRACT

The present disclosure relates to a method for processing input visual data using a generated algorithm based upon input visual data and the output of a calculated energy function. According to a first aspect of the disclosure, there is provided a method for enhancing input visual data using an algorithm, the method comprising evaluating gradients of the output of an energy function with respect to the input visual data; using the gradient output to enhance the input visual data; and outputting the enhanced visual data.

20 Claims, 4 Drawing Sheets

(51) Int. Cl.
*G06N 20/00* (2019.01)
*G06T 5/00* (2006.01)

(52) U.S. Cl.
CPC .............. *G06T 2207/20021* (2013.01); *G06T 2207/20081* (2013.01); *G06T 2207/20084* (2013.01)

(56) References Cited

U.S. PATENT DOCUMENTS

| | | | |
|---|---|---|---|
| 5,831,678 A | 11/1998 | Proctor | |
| 6,075,884 A | 6/2000 | Lubin et al. | |
| 6,470,097 B1 | 10/2002 | Lai et al. | |
| 6,735,336 B2* | 5/2004 | Avni | B82Y 10/00 382/205 |
| 7,133,568 B2* | 11/2006 | Nikitin | G01D 1/00 382/260 |
| 7,477,800 B2* | 1/2009 | Avidan | G06T 3/0012 382/254 |
| 7,623,731 B2* | 11/2009 | Lim | G06T 7/20 382/277 |
| 7,676,441 B2 | 3/2010 | Matsugu et al. | |
| 8,037,010 B2 | 10/2011 | Jaros et al. | |
| 8,311,967 B1 | 11/2012 | Lin et al. | |
| 8,331,615 B2* | 12/2012 | Furukawa | G06T 7/596 382/103 |
| 8,467,599 B2 | 6/2013 | El | |
| 8,731,255 B2* | 5/2014 | El-Baz | G06T 7/0016 382/128 |
| 9,208,539 B2* | 12/2015 | Choudhury | G06T 5/00 |
| 9,824,421 B2* | 11/2017 | Ragozin | G06T 3/40 |
| 9,904,889 B2* | 2/2018 | Eliasmith | G06N 3/049 |
| 9,906,787 B2 | 2/2018 | Amon et al. | |
| 10,523,955 B2 | 12/2019 | Wang et al. | |
| 2003/0071908 A1 | 4/2003 | Sannoh et al. | |
| 2004/0136567 A1 | 7/2004 | Billinghurst et al. | |
| 2004/0150538 A1 | 8/2004 | Kim et al. | |
| 2004/0218834 A1 | 11/2004 | Bishop et al. | |
| 2005/0063461 A1 | 3/2005 | Lee et al. | |
| 2005/0200757 A1 | 9/2005 | Pica et al. | |
| 2007/0172452 A1 | 7/2007 | Klucher et al. | |
| 2007/0223887 A1 | 9/2007 | Kanamori et al. | |
| 2009/0034622 A1 | 2/2009 | Huchet et al. | |
| 2009/0067491 A1 | 3/2009 | Sun et al. | |
| 2009/0110285 A1 | 4/2009 | Elad et al. | |
| 2009/0232213 A1 | 9/2009 | Jia | |
| 2010/0020874 A1 | 1/2010 | Shin et al. | |
| 2010/0150229 A1 | 6/2010 | Francois et al. | |
| 2010/0183217 A1 | 7/2010 | Seung et al. | |
| 2011/0299770 A1 | 12/2011 | Vaddadi et al. | |
| 2011/0304687 A1 | 12/2011 | Joshi et al. | |
| 2012/0288015 A1 | 11/2012 | Zhang et al. | |
| 2012/0294369 A1 | 11/2012 | Bhagavathy et al. | |
| 2013/0128111 A1 | 5/2013 | Corral-Soto | |
| 2013/0223734 A1 | 8/2013 | Tuzel et al. | |
| 2014/0177706 A1 | 6/2014 | Fernandes et al. | |
| 2014/0204996 A1 | 7/2014 | Spears et al. | |
| 2014/0301661 A1 | 10/2014 | Voronov et al. | |
| 2014/0369401 A1 | 12/2014 | Minoo et al. | |
| 2015/0015569 A1 | 1/2015 | Jung et al. | |
| 2015/0181159 A1 | 6/2015 | Matsuyama | |
| 2016/0078600 A1 | 3/2016 | Perez Pellitero et al. | |
| 2016/0140408 A1 | 5/2016 | Shen et al. | |
| 2018/0075581 A1 | 3/2018 | Shi et al. | |
| 2018/0121769 A1* | 5/2018 | Huszar | G06K 9/66 |
| 2018/0129893 A1 | 5/2018 | Son et al. | |
| 2018/0139458 A1 | 5/2018 | Wang et al. | |

FOREIGN PATENT DOCUMENTS

| | | |
|---|---|---|
| CN | 103369349 A | 10/2013 |
| EP | 0618737 A2 | 10/1994 |
| EP | 1720358 A2 | 11/2006 |
| EP | 2557789 A2 | 2/2013 |
| KR | 20030009575 A | 2/2003 |
| WO | 9739417 A2 | 10/1997 |
| WO | 02/005208 A3 | 1/2002 |
| WO | 2008133951 A2 | 11/2008 |
| WO | 2013143396 A1 | 10/2013 |
| WO | 2014052740 A1 | 4/2014 |
| WO | 2015193531 A1 | 12/2015 |
| WO | 2017/178808 A1 | 10/2017 |

OTHER PUBLICATIONS

International Search Report and Written Opinion for PCT Application No. PCT/GB2017/051008, dated Jun. 26, 2017, 17 pages.
Gendy, et al., "A Fast Algorithm for Image Restoration Using a Recurrent Neural Network with Bound-Constrained Duadratic Optimization", The Seventh Australian and New Zealand Intelligent Information Systems Conference, Nov. 18, 2001, pp. 111-116.
Liu, et al., "An Adaptive Image Denoising Model Based on Tikhonov and TV Regularizations", Advances in Multimedia, vol. 2014, Jan. 1, 2014, 11 pages.
Muneyasu, et al., "Image Restoration Using Layered Neural Networks and Hopfield Networks", Proceedings of the International Conference on Image Processing, vol. 2, Oct. 23, 1995, pp. 33-36.
Rudin, et al., "Non-Linear Total Variation Based Noise Removal Algorithms", Physica D, vol. 60, No. 1-4, Nov. 1, 1992, pp. 259-268.
"CS231n Convolutional Neural Networks for Visual Recognition", retrieved on Feb. 16, 2015, XP055488606, 2 pages.
Wikipedia, "Universal Approximation Theorem", Retrieved from http://web.archive.org/web/20100701194338/https://en.wikipedia.org/wiki/Universal_approximation_theorem, Jun. 10, 2010, 2 pages.
Atreya, et al., "Novel Lossy Compression Algorithms With Stacked Autoencoders", retrieved rom at http://cs229.stanford.edu/proj2009/AtreyaOshea.pdf, Dec. 11, 2009, 5 pages.
Bevilacqua, et al., "Video Super-Resolution via Sparse Combinations of Key-Frame Patches in a Compression Context", 30th Picture Coding Symposium (PCS), Dec. 8, 2013, 5 pages.
Bishop, "Super-Resolution Enhancement of Video", International Workshop on Artificial Intelligence and Statistics (AISTATS 2003), No. 9th, Jan. 2003, pp. 1-8.
Dayton, "Algorithms for manifold learning", Jun. 15, 2005, 17 pages.
Cheng, et al., "Fast Video Super-Resolution Using Artificial Neural Networks", 8th IEEE, IET International Symposium on Communication Systems, Networks and Digital Signal Processing, Jul. 18, 2012, 4 pages.
Chopra, et al., "Learning a similarity metric discriminatively, with application to face verification", In IEEE Conference on Computer Vision and Pattern Recognition (CVPR), 2005, 8 pages.
Dong, et al., "Compression Artifacts Reduction by a Deep Convolutional Network", IEEE International Conference on Computer Vision, Apr. 27, 2015, pp. 576-584.
Dong, et al., "Learning a Deep Convolutional Network for Image Super-Resolution", ECCV 2014, Part IV, LNCS 8692, Sep. 6, 2014, pp. 184-199.
Kim, et al., "Example-based Learning for Single-Image Super-Resolution and JPEG Artifact Removal", Technical Report No. TR-173, retrieved on Jun. 1, 2016 from http://www.kyb.mpg.de/fileadmin/user_upload/files/publications/attachments/TechReport-173, Aug. 2008, 28 pages.
Kwon, et al., "Adaptive Postprocessing Algorithm in Block-Coded Images Using Block Classification and MLP", IEEE Transactions on Fundamentals of Electronics, Communications and Computer Sciences, Engineering Sciences Society, vol. E86-A, No. 4, Apr. 1, 2003, pp. 961-967.
Liu, et al. "Nonparametric Scene Parsing: Label Transfer via Dense Scene Alignment", IEEE Conference on Computer Vision and Pattern Recognition, Jun. 2009, 8 pages.
Long et al. "Fully convolutional networks for semantic segmentation", IEEE Conference on Computer Vision and Pattern Recognition (CVPR), 2015, pp. 3431-3440.
Matikainen, et al., "Model Recommendation for Action Recognition", IEEE Conference on Computer Vision and attem Recognition, 2012, pp. 2256-2263.

(56) References Cited

OTHER PUBLICATIONS

Mittal, et al., "No-Reference Image Quality Assessment in the Spatial Domain", IEEE Transactions on Image Processing, vol. 21, Issue 12, Dec. 2012, 14 pages.

Nielsen, "A Visual Proof That Neural Nets Can Compute Any Function", Neural Networks and Deep Learning, Chapter 4, XP055562061, Feb. 6, 2015, 32 pages.

Pan, et al., "A Survey on Transfer Learning", IEEE Transactions on Knowledge and Data Engineering, vol. 22, No. 10, Oct. 2010, pp. 1345-1359.

Park, et al., "Super-Resolution Image Reconstruction: A Technical Overview", IEEE Signal Processing Magazine, vol. 20, No. 3, May 1, 2003, pp. 21-36.

Shi, et al., "Is the Deconvolution Layer the Same as a Convolutional Layer?", retrieved on Mar. 11, 2019 from https://arxiv.org/ftp/arxiv/papers/1609/1609.07009.pdf, Sep. 22, 2016, 7 pages.

Torralba, et al., "80 million tiny images: a large dataset for non-parametric object and scene recognition", IEEE Transactions on Pattern Analysis and Machine Intelligence, vol. 30, Issue 11, Nov. 2008, 12 pages.

Wagstaff, et al., "Constrained K-means clustering with background knowledge", Proceedings of the Eighteenth International Conference on Machine Learning, 2001, 8 pages.

Wang, et al., "Deep Networks for Image Super-Resolution with Sparse Prior", International Conference on Computer Vision (ICCV), Dec. 1, 2015, 9 pages.

Wang, et al., "Self-Tuned Deep Super Resolution", 2015 IEEE Conference on Computer Vision and Pattern Recognition Workshops, XP032795527, 2015, 8 pages.

Yang, et al., "Coupled Dictionary Training for Image Super-Resolution", IEEE Transactions on Image Processing, vol. 21, Issue 8, Aug. 2012, 27 pages.

Yang, "Image super-resolution via sparse representation", IEEE Transactions on Image Processing, vol. 19, Issue 11, Nov. 2010, 51 pages.

Yang, et al., "Single-Image Super-Resolution Reconstruction via Learned Geometric Dictionaries and Clustered Sparse Coding", IEE Transactions on Image Processing, vol. 21, No. 9, Sep. 1, 2012, 13 pages.

Zeyde, et al., "On Single Image Scale-Up Using Sparse-Representations", Curves and Surfaces, Springer, 2012, pp. 711-730.

Zuo, et al., "Content-Adaptive Resolution Enhancement of Compressed Video with Encoder-Generated Side Information", International Conference on Consumer Electronics, Jan. 9, 2008, pp. 1-2.

Office Action for European Application No. 16706416.1, dated Dec. 17, 2019, 6 pages.

Kavukcuoglu, et al., "Learning Invariant Features Through Topographic Filter Maps", CVPR 2009, Jun. 20, 2009, pp. 1605-1612.

Dsendorfer, et al., "Image Super-Resolution With Fast Approximate Convolutional Sparse Coding", ICONIP 2014, pp. 250-257.

Peyrard, et al., "A Comparison Between Multi-Layer Perceptrons and Convolutional Neural Networks for Text Image Super-Resolution", Proceedings of the 10th International Conference on Computer Vision Theory and Applications, Jan. 1, 2015, pp. 84-91.

\* cited by examiner

VISUAL DATA PROCESSING USING ENERGY NETWORKS

CROSS REFERENCE TO RELATED APPLICATIONS

This application is a continuation of, and claims priority to, International Patent Application No. PCT/GB2017/051008, filed on Apr. 11, 2017, which claims priority to United Kingdom Application No. GB 1606298.6, filed on Apr. 12, 2016, the contents of both of which are incorporated herein by reference

FIELD

The present disclosure relates to a method for processing input visual data using a generated algorithm based upon input visual data and the output of a calculated energy function.

BACKGROUND

Machine learning is the field of study where a computer or computers learn to perform classes of tasks using the feedback generated from the experience the machine learning process gains from computer performance of those tasks.

Machine learning is classified into three main categories: (i) supervised learning; (ii) unsupervised learning and (iii) reinforcement learning.

Supervised machine learning is concerned with a computer learning one or more rules or functions to map between example inputs and desired outputs as predetermined by an operator or programmer, usually where a data set containing the inputs is labelled.

Unsupervised learning may be concerned with determining a structure for input data, for example when performing pattern recognition, and may use unlabelled data sets.

Reinforcement learning may be concerned with enabling a computer or computers to interact with a dynamic environment, for example determining how well a machine performs the learning.

There are variations and specialised approaches which fall in-between or outside these categories, such as "semi-supervised" machine learning where a training data set has only been partially labelled.

For unsupervised machine learning, there is a range of possible applications such as, for example, the application of computer vision techniques to visual data processing. Unsupervised machine learning may be applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to high-dimensional data sets, or using k-means clustering to cluster data by a measure of the Euclidean distance between each datum).

Semi-supervised learning may be applied to solve problems where there is a partially labelled data set, for example where only a subset of the data is labelled. Semi-supervised machine learning makes use of externally provided labels and objective functions as well as any implicit data relationships.

When initially configuring a machine learning system, when using a supervised machine learning approach, the machine learning algorithm can be provided with some training data or a set of training examples, in which each example may be a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values. The machine learning algorithm must be provided with enough data so as to be able to correctly learn and model for the dimensionality of the problem they are trying to solve, without providing too many features (which can result in too many dimensions being considered by the machine learning process during training). The user must also determine the desired structure of the learned or generalised function, for example whether to use support vector machines or decision trees.

The use of unsupervised or semi-supervised machine learning approaches are often used when labelled data is not readily available, or where the system generates new labelled data from unknown data given some initial seed labels.

For example, for the case where machine learning is used for visual data processing, using dictionary representations for images, techniques are generally referred to as dictionary learning. In dictionary learning, where sufficient representations, or atoms, are not available in a dictionary to enable accurate representation of an image, machine learning techniques can be employed to tailor dictionary atoms such that they can more accurately represent the image features and thus obtain more accurate representations.

When using machine learning where there is an objective function and optimisation process, for example where using sparse coding principles, a training process is used to find optimal representations that can best represent a given signal or labelling (where the labelling can be externally provided such as in supervised or semi-supervised learning or where the labelling is implicit within the data as for unsupervised learning), subject to predetermined initial conditions such as a level of sparsity.

Many current methods of neural-network super resolution use a least squares objective or a variant thereof such as peak signal-to-noise ratio. Generally the training objective is represented by:

$$\min_{\theta} \mathbb{E}_{x,y} \|y - \hat{y}(x; \theta)\|_2^2 \qquad \text{Equation 1}$$

where x is a low resolution image, y is a high resolution image, and $\hat{y}$ is an estimate of the high resolution image generated by a neural network with the parameters of $\theta$.

When provided with other variables and/or inputs neural networks may also be used for visual data denoising and reconstruction. However, typical neural networks when used for this purpose, require the input of the image to be processed and the output to be as close as possible to the desired noiseless/reconstructed image.

SUMMARY

Aspects and/or embodiments are set out in the appended claims.

Some aspects and/or embodiments can improve the effectiveness enhancing visual data using machine learning techniques. These and other aspects and embodiments are also described herein.

Certain aspects and/or embodiments seek to provide techniques for generating hierarchical algorithms that can be used to create improved fidelity visual data based on an original received input visual data and a piece of reference fidelity visual data or to synthesize content.

Other aspects and/or embodiments seek to provide techniques for machine learning.

According to an example aspect, there is provided a method for enhancing input visual data using an algorithm, the method comprising evaluating gradients of the output of an energy function with respect to the input visual data; using the gradient output to enhance the input visual data; and outputting the enhanced visual data.

A processing algorithm may be generated using the gradient outputs and the input visual data. The processing algorithm may be used to output the enhanced visual data. The output enhanced visual data may be based on the input visual data.

The evaluating gradients of the output of the energy function and generating a processing algorithm using the gradient outputs enables processing of the input visual data using the algorithm which may be further trained to optimise the effectiveness of the processing algorithm's ability to enhance the input visual data.

Optionally, the output of the energy function is a scalar.

Optionally, the energy function may be any of an algorithm, hierarchical algorithm, computation, formula or subroutine which, in some embodiments, may receive one or more sections of the input visual data, and may output a real valued scalar.

Optionally, the energy function comprises a plurality of layers, which may be any of sequential, recurrent, recursive, branching or merging.

Having a number of layers in some embodiments, which may or may not be sequential, recurrent, recursive, branching or merging allows different levels of processing to occur at different times and the layers can work in parallel, ensuring optimal efficiency when enhancing the resolution of the visual data.

Optionally, calculating the gradient outputs comprises automatic differentiation or backpropagation.

In some embodiments, the use of automatic differentiation or backpropagation may enable the method to more accurately train the algorithm to process and enhance the input visual data.

Optionally, the method may further comprise receiving the input visual data.

In some embodiments, it may be desirable for the input visual data to be stored remotely, as opposed to locally on a device configured to execute the method.

Optionally, the energy function may comprise a plurality of parameters, and one or more of the plurality of parameters may be trainable. In some embodiments, the plurality of parameters may be trained via a training algorithm.

The use of additional parameters enables further training of the network so as to produce an output that can be more desirable, for example in an embodiment directed towards super-resolution providing the function with low-resolution visual data may aid in training the function so as to produce a more accurate high-resolution version of inputted visual data. Furthermore, the training of the plurality of parameters enables more accurate parameters to be developed and used in further iterations of the method.

Optionally, the processing algorithm may calculate a linear combination of the input visual data it receives, and the gradients of the energy function.

This enables the outputs of the processing algorithm to be based upon the generated gradients of the energy function and the input visual data. It will be appreciated that other combinations of the input visual data and gradients may be used, such as a non-linear combination.

Optionally, the outputted enhanced visual data is fed-back into the processing algorithm and processed further in a recurrent fashion.

The use of the outputted enhanced visual data as an input into a further iteration of the method enables the continued processing of the visual data and further training of the network.

Optionally, the energy function is pre-trained, fine-tuned, or trained using a learned approach, wherein the learned approach may comprise machine learning techniques. In some embodiments, the energy function may comprise any of one or more: convolutional neural networks, recurrent neural networks, random forests, long-short term memory, memory networks, gated recurrent, or dictionary learning based methods.

In some embodiments, the training of convolutional neural networks can be more computationally complex than dictionary learning for a similar accuracy, but the resulting model or algorithm can also be more flexible in representing visual data while using fewer coefficients for the reconstruction. In some embodiments, the resultant convolutional neural network model to be transmitted alongside the lower-quality visual data can be both smaller and can be more accurate in the reconstruction of the higher-quality visual data.

Some aspects can provide an improved technique for generating reconstruction parameters that can be used, when converting original high-quality visual data into a downsampled low-quality visual data, to allow recreation of higher quality visual data without significant loss in quality, for example having a low reconstruction error in comparison with the original visual data, and with a reduction in visual data transferred over a network. In such aspects, the application of such a technique can reduce the data transmitted when transmitting visual data in comparison with existing techniques while enabling reproduction of the visual data at its original quality without significant loss in quality in comparison to the original visual data (where quality can be defined by objective metrics such as error rate, PSNR and SSIM as well as subjective measures) or, based on a perception measure or metric rather than on a pixel-wise comparison of images. In such aspects, such a proposed technique can allow minimal changes to be made to the overall infrastructure of service providers, as it can augment most existing compression techniques, and can provide advantages in encoding and streaming applications.

Optionally, the processing algorithm performs single image or video super-resolution and/or a spatio-temporal approach to process video.

In some embodiments, optionally for use for a section of visual data, the example based model may be a neural network and can use spatio-temporal convolution. In some embodiments, separating visual data into a series of sections allows for the individual sections to be down-sampled thus reducing the visual data size, thereby allowing for lower quality sections to be transmitted as re-encoded visual data in the original or optionally a more optimal codec but at a lower quality. In some embodiments, a spatio-temporal network can allow an improvement in performance by exploiting the temporal information in the visual data and, for example, within a similar scene in sequential sections of visual data, there may be stationary sections of background in the sequential sections providing information relevant for the higher-quality version of that scene such that temporally consecutive sections can be used to super resolve one section.

Optionally, the input visual data comprises a plurality of sections, which may comprise a plurality of low-quality inputs, wherein quality may be measured subjectively.

In some embodiments the use of a plurality of sections of visual data enables more accurate processing of the input visual data. Receiving a plurality of sections, which may or may not be consecutive sections, can provide more information to be used to train the algorithm.

Optionally, a section of visual data may comprise any of: a single frame of visual data, a sequence of frames of visual data, and a region within a frame or sequence of frames of visual data.

This allows the method to enhance various types of visual data, including but not limited to, still images, video, and computer generated/rendered content.

Optionally, the processing algorithm is configured to be used for any of: removing compression artefacts; dynamic range enhancement; image generation and synthesis; image inpainting; image de-mosaicing; denoi sing, and super-resolution.

In some embodiments, the algorithm may be directed towards any of removing compression artefacts, dynamic range inference, image inpainting, image de-mosaicing, and denoising so as to allow for enhancing the quality of the received visual data in a plurality of ways.

Optionally, where the optimisation network is configured to be used for denoising, a least-squares objective function is used.

The use of a least-squares objective function enables the method to capture statistical characteristics of the visual data.

Optionally, the processing algorithm may compute the enhanced visual data by combining the input visual data, the calculated gradients, and additional functions of the input visual data to compute the enhanced visual data.

The combination of the input visual data, calculated gradients and additional functions enables a more accurate processing of the visual data, based on received and generated data.

Optionally, the additional functions of the input data may be computed using an algorithm consisting of a plurality of layers.

Having a number of layers in some embodiments, which may or may not be sequential, recurrent, recursive, branching or merging allows different levels of processing to occur at different times and the layers can work in parallel, ensuring optimal efficiency when enhancing the resolution of the visual data.

Optionally, the additional functions of the input data may consist of a plurality of parameters. In some embodiments, the one or more of a plurality of parameters may be trainable.

The use of additional parameters enables further training of the network so as to produce an output that can be more desirable, for example in an embodiment directed towards super-resolution providing the function with low-resolution visual data may aid in training the function so as to produce a more accurate high-resolution version of inputted visual data. Furthermore, the training of the plurality of parameters enables more accurate parameters to be developed and used in further iterations of the method.

Aspects and/or embodiments include a computer program product comprising software code to effect the method and/or apparatus of other aspects and/or embodiments herein described.

It should be noted that in some aspects and/or embodiments, the terms model and/or algorithm and/or representation and/or parameters and/or functions can be used interchangeably.

It should also be noted that visual data, in some embodiments, may comprise image and/or video data.

References to visual data can be references to video data and/or image data in some aspects and/or embodiments and vice versa. References to low-quality and/or lower-quality can be references to low-resolution and/or lower-resolution in some aspects and/or embodiments and vice versa. References to high-quality and/or higher-quality and/or highest quality and/or original quality can be references to high-resolution and/or higher-resolution and/or highest-resolution and/or original resolution and/or increased fidelity in some aspects and/or embodiments and vice versa. References to sections can be references to frames and/or portions of frames in some aspects and/or embodiments and vice versa. References to enhance or enhancement can be references to upscale and/or upscaling in some aspects and/or embodiments and vice versa.

BRIEF DESCRIPTION OF FIGURES

Embodiments of the present disclosure will now be described, by way of example only and with reference to the accompanying drawings in which.

DETAILED DESCRIPTION

Various embodiments will now be described below in detail with reference to the Figures referenced above.

In some embodiments, it is possible to overcome the issues associated with using a neural network to process visual data to achieve various improvements, such as the removal of noise or the reconstruction of visual data. The use of a derivative of a neural network with respect to the input visual data, rather than the use of the neural network itself, to model a process, such as a denoising process, can result in an enhanced output.

The use of the derivative neural networks extends current popular methods of building hierarchical representations of data in unsupervised learning, and in some embodiments semi-supervised learning may be used to exploit large amounts of unlabelled data to build a classifier using a smaller set of labelled examples.

Figure 1:
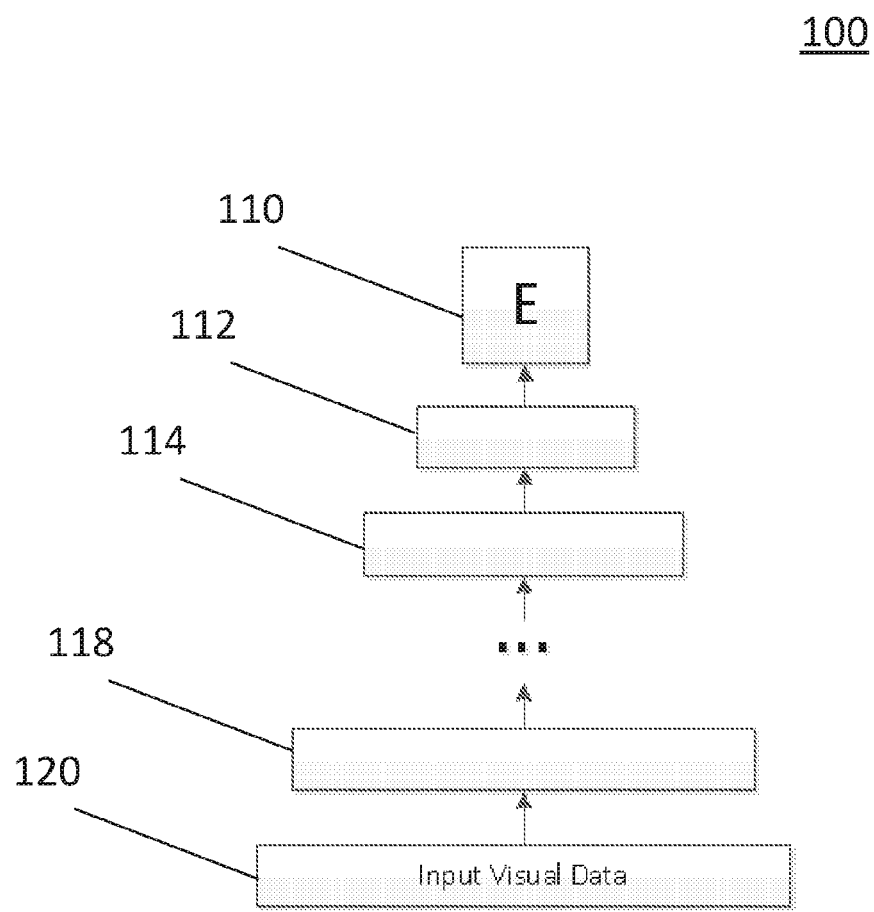
FIG. 1 illustrates an example of an Energy Network based on input visual data.

Referring to FIG. 1, there is an Energy Network 100 with an energy function 110 that takes as an input visual data and outputs a single real-valued output for each datum in the input data it receives. In some embodiments, each datum may be representative of a single frame, a group of frames, a section of a single frame or a section of the group of frames of visual data.

In some embodiments, the Energy Network 100 is constructed such that it comprises a plurality of layers 112, 114, 118. In some embodiments, the Energy Network may be a deep convolutional neural network, however the skilled person will recognise other algorithms may be appropriate.

In some embodiments, the Energy Network 100 is such that one or more gradients 219 may be calculated with respect to the input 120 to the algorithm. In some embodiments, the gradients may be calculated using automatic differentiation of backpropagation. The layers 212, 214, 218 illustrate intermediate steps of backpropagation or partial results of the computational graph obtained by automatic differentiation.

Based on the Energy Network 100 and the calculated gradients 219 a processing network or algorithm 200, f, may be defined. Where the Energy Network 100 is a neural network, the resulting processing network/algorithm has the architecture depicted in FIG. 2. In some embodiments, the processing network/algorithm 200 may be defined such that:

$$f(x;\theta)=x-c\nabla_x E(x;\theta) \qquad \text{Equation 2}$$

where x is representative of the input visual data 120, E is the Energy Network 100, $\theta$ are the parameters of the Energy Network 100, and c is a constant.

In some embodiments, the constant, c, may be a positive constant, and in further embodiments, where the processing network/algorithm 200 is used to denoise the input visual data 120, c may be related to the variance of the additive Gaussian noise. The additive Gaussian noise may be removed from images using a least-squares objective function, where c may be set to be twice the noise variance. In said embodiments the processing network/algorithm 200 and its associated parameters, $\theta$, may be trained via machine learning. It will be appreciated by the skilled person that the processing network or algorithm 200 may be trained for a plurality of other uses, such as image reconstruction, the removal of compression artefacts; dynamic range enhancement; image generation and synthesis; image inpainting; image de-mosaicing; denoising, and super-resolution.

In yet further embodiments, the processing network or algorithm 200 may be used recursively, wherein the output visual data 220 of a first iteration of the processing network/algorithm 200 is used as the input visual data of a second iteration of the processing network/algorithm 200. The use of the output visual data 220 as an input to the processing network/algorithm resulted in a recurrent neural network defined as:

$$g(x;\theta)=f(f(\ldots f(x;);\theta\ldots);\theta) \qquad \text{Equation 3}$$

$$g_{n+1}(x;\theta):=f(g_n(x;\theta);\theta), n=1,\ldots N$$

$$g:=g_N \qquad \text{Equation 4}$$

In some embodiments, a transfer learning setup may be used. In such embodiments, the Energy Network 100 may involve pre-trained components, such as re-using lower layers of a VGG-19 network trained to perform object recognition on a pre-determined data set such as Imagenet.

Figure 3:
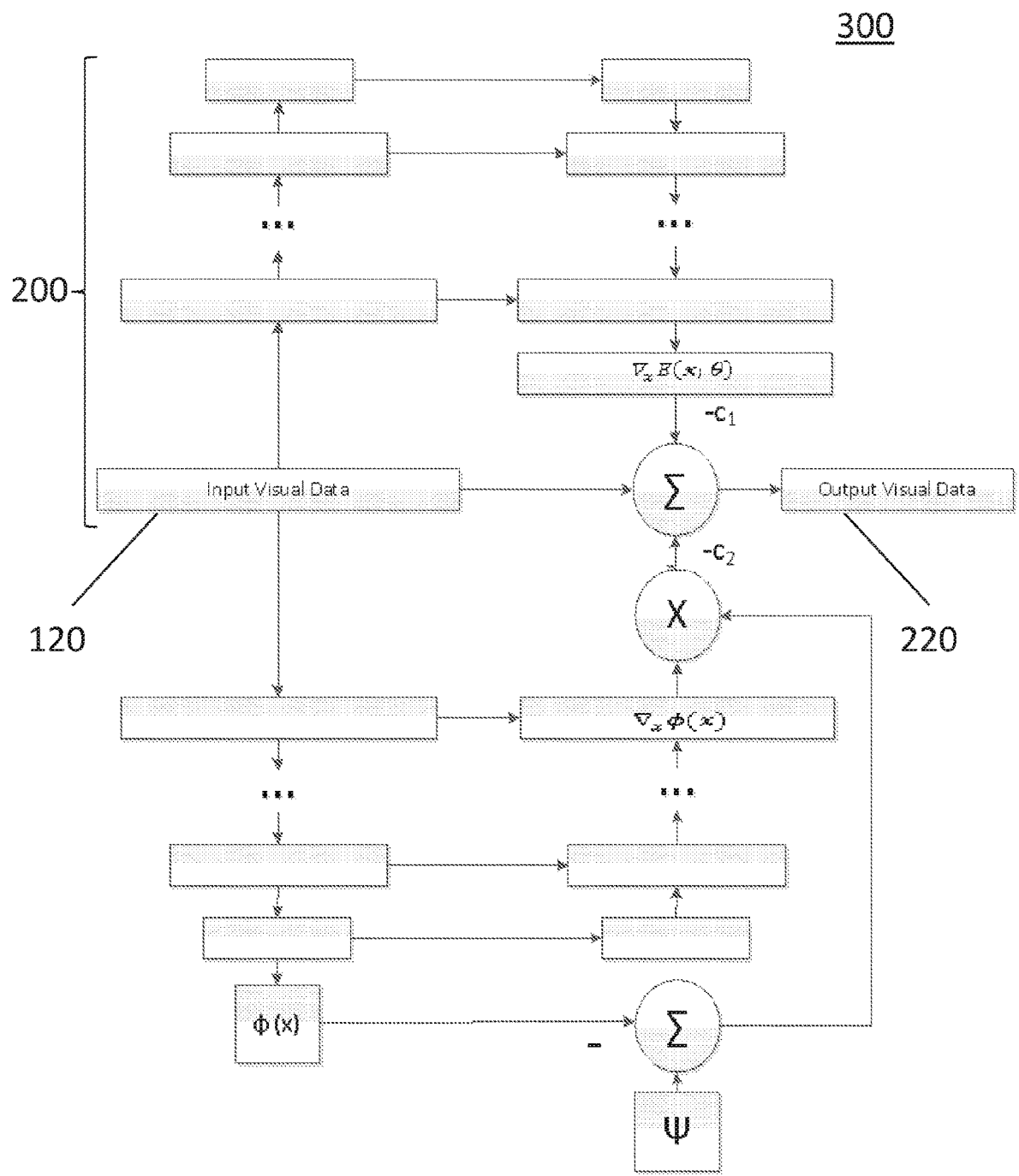
FIG. 3 illustrates a further example of a processing network/algorithm for enhancing input visual data using a plurality of additional terms.

With reference to FIG. 3, in some embodiments the processing network/algorithm 200, f, may be implemented with other components or processing paths. One such example may be a model which comprises a processing network/algorithm 200 with an additional term as shown in Equation 5, below. The effect of the addition may result in certain characteristics of a networks output, $\phi$, to be closed of the output of the processing network/algorithm 200 to be close to a pre-defined target value, $\Phi$).

$$f(x;\theta)=x-c_1\nabla_x E(x;\theta)-c_2(\phi(x)-\Phi)\nabla_x\phi(x) \qquad \text{Equation 5}$$

In some embodiment, $\phi$ may depend on one or more additional inputs to the network, y, such that:

$$f(x;\theta)=x-c_1\nabla_x E(x;\theta)-c_2(\phi(x)-\psi(y))\nabla_x\phi(x) \qquad \text{Equation 6}$$

In accordance with Equation 6, and FIG. 3, in an embodiment where this example network or algorithm 300 is used for super-resolution, the input visual data 120, x, may correspond to an initial estimate of high-resolution visual data to the example network or algorithm 300, the additional inputs, y, may correspond to the low-resolution visual data, and $\phi$ may represent a known operation used to downsample the high-resolution visual data to obtain the low-resolution visual data. It will be appreciated by the person skilled in the art that the above is merely an example, and the network or algorithm 300 may be used to enhance or process visual data in a plurality of ways, such as those mentioned previously.

Furthermore, in some embodiments, the variables c, $c_1$, and $c_2$ may be trainable and included in the trainable parameters of f.

It should also be appreciated that various combinations of the various features described and defined in any aspects of the disclosure can be implemented and/or supplied and/or used independently.

Some of the example embodiments are described as processes or methods depicted as flowcharts. Although the flowcharts describe the operations as sequential processes, operations may be performed in parallel, or concurrently or simultaneously. In addition, the order or operations may be re-arranged. The processes may be terminated when their operations are completed, but may also have additional steps not included in the figures. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the relevant tasks may be stored in a machine or computer readable medium such as a storage medium. A processing apparatus may perform the relevant tasks.

Figure 4:
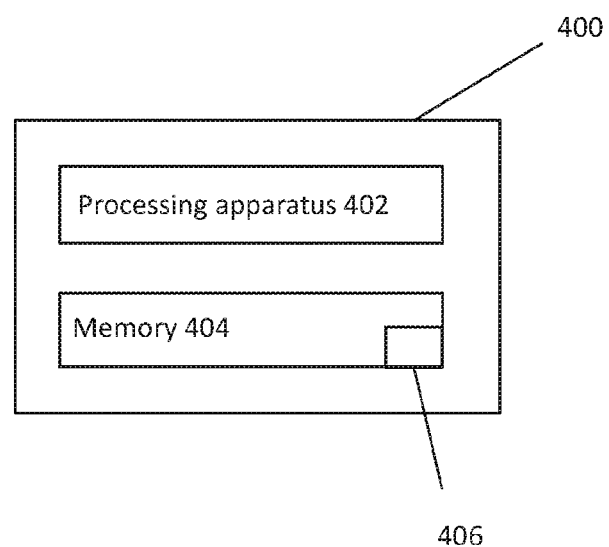
FIG. 4 illustrates an apparatus comprising a processing apparatus and memory according to an embodiment.

FIG. 4 shows an apparatus 400 comprising a processing apparatus 402 and memory 404 according to an embodiment. Computer-readable code 406 may be stored on the memory 404 and may, when executed by the processing apparatus 402, cause the apparatus 400 to perform methods as described here, for example a method with reference to FIGS. 4 and 5.

The processing apparatus 402 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. In another example, the processing apparatus may be, for example, programmable hardware with embedded firmware. In another additional example, the processing apparatus may include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 402 is coupled to the memory 404 and is operable to read/write data to/from the memory 404. The memory 404 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Methods described in the illustrative embodiments may be implemented as program modules or functional processes including routines, programs, objects, components, data structures, etc., that perform certain tasks or implement certain functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

Further implementations are summarized in the following examples:

EXAMPLE 1

A method for enhancing input visual data using an algorithm, the method comprising the steps of:
evaluating gradients of the output of an energy function with respect to the input visual data;
generating a processing algorithm using the gradient outputs and the input visual data; and
using the processing algorithm to output enhanced visual data;
wherein the output of the energy function is a scalar; and the enhanced visual data is based on the input visual data.

EXAMPLE 2

The method of example 1, wherein the energy function is any of an algorithm, hierarchical algorithm, computation, formula or subroutine.

EXAMPLE 3

The method of any previous example, wherein the energy function receives one or more sections of the input visual data.

EXAMPLE 4

The method of any previous example, wherein the energy function outputs a real valued scalar.

EXAMPLE 5

The method of any previous example, wherein the energy function comprises a plurality of layers.

EXAMPLE 6

The method of any previous example, wherein the step of calculating the gradient outputs comprises automatic differentiation.

EXAMPLE 7

The method of any one of examples 1 to 5, wherein the step of calculating the gradient outputs comprises back-propagation.

EXAMPLE 8

The method of any previous example, further comprising the steps of receiving the input visual data.

EXAMPLE 9

The method of any previous example, wherein the energy function comprises a plurality of parameters.

EXAMPLE 10

The method of example 9, wherein the processing algorithm calculates a linear combination of the input visual data it receives, and the gradients of the energy function.

EXAMPLE 11

The method of any of examples 9 or 10, wherein one or more of the plurality of parameters are trainable.

EXAMPLE 12

The method of example 11, where in the plurality of parameters are trained via a training algorithm.

EXAMPLE 13

The method of example 5, wherein the layers are any of sequential, recurrent, recursive, branching or merging.

EXAMPLE 14

The method of any previous example, wherein the outputted enhanced visual data is fed back into the processing algorithm and processed further in a recurrent fashion

EXAMPLE 15

The method of any of examples 9 through 14, wherein the energy function is pre-trained, fine-tuned, or trained using a learned approach.

EXAMPLE 16

The method of example 15, wherein the learned approach comprises machine learning techniques.

EXAMPLE 17

The method of any previous example, wherein the energy function comprises any of one or more: convolutional neural networks, recurrent neural networks, random forests, long-short term memory, memory networks, gated recurrent, or dictionary learning based methods.

EXAMPLE 18

The method of any previous example, wherein the processing algorithm performs single image or video super-resolution.

EXAMPLE 19

The method of any previous example, wherein the algorithm uses a spatio-temporal approach to process video.

EXAMPLE 20

The method of any previous example, wherein the input visual data comprises a plurality of sections.

EXAMPLE 21

The method of example 20, wherein the plurality of sections comprises a plurality of low-quality inputs.

EXAMPLE 22

The method of examples 20 or 21 wherein quality can be measured subjectively.

EXAMPLE 23

The method according to any of examples 20 through 22, wherein a section of visual data comprises any of: a single frame of visual data, a sequence of frames of visual data, and a region within a frame or sequence of frames of visual data

EXAMPLE 24

The method of any previous example, wherein the processing algorithm is configured to be used for any of: removing compression artefacts; dynamic range enhancement; image generation and synthesis; image inpainting; image de-mosaicing; denoising, and super-resolution.

EXAMPLE 25

The method of example 22 wherein, when the processing algorithm is configured to be used for denoising, a least-squares objective function is used.

EXAMPLE 26

The method of any previous example, wherein the processing algorithm computes the enhanced visual data by combing the input visual data, the calculated gradients, and additional functions of the input visual data to compute the enhanced visual data.

EXAMPLE 27

The method of examples 26, wherein the additional functions of the input data may be computed using an algorithm consisting of a plurality of layers.

EXAMPLE 28

The method of any of examples 26 or 27, wherein the additional functions of the input data consist of a plurality of parameters.

EXAMPLE 29

A method of example 28, wherein one or more of a plurality of parameters are trainable.

EXAMPLE 30

Figure 2:
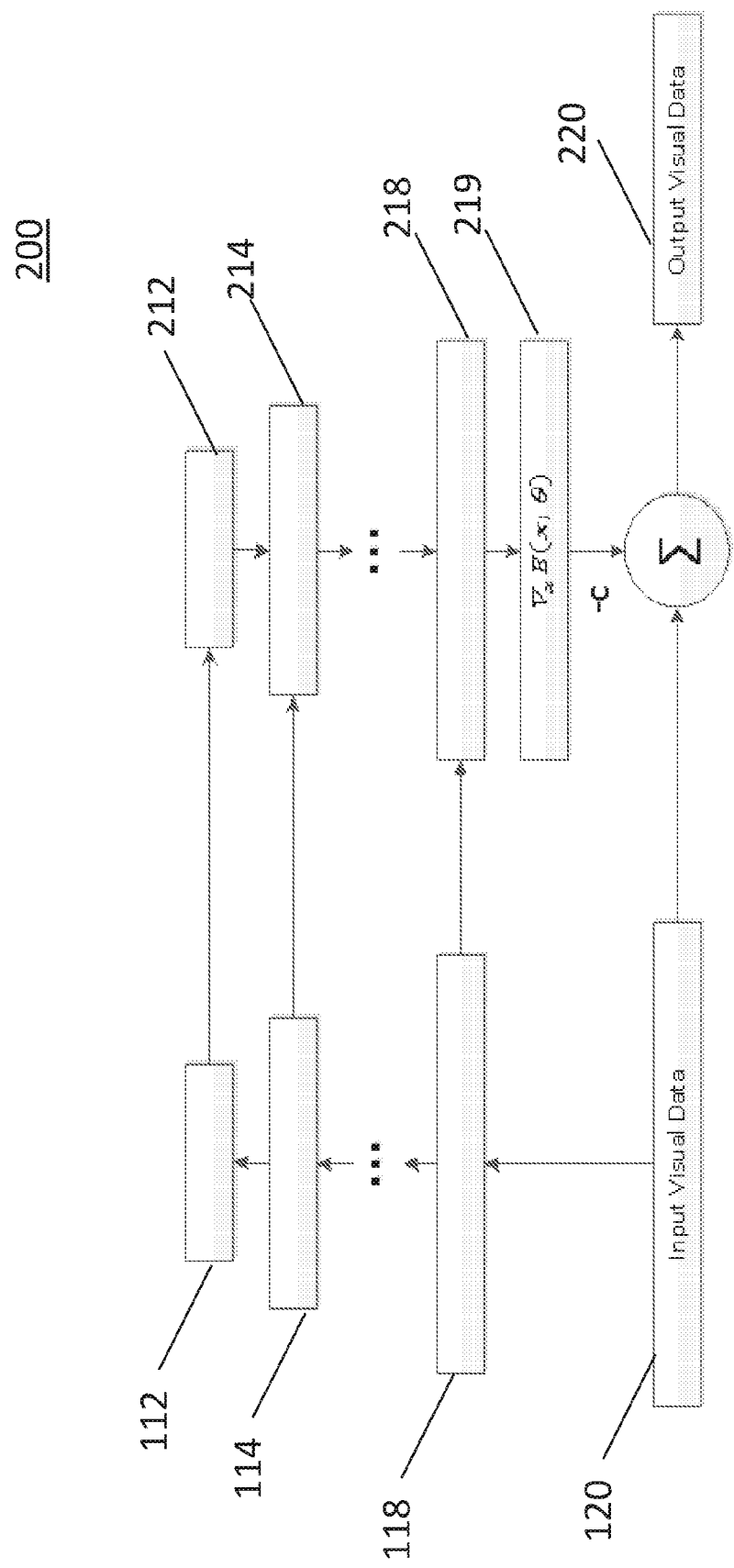
FIG. 2 illustrates an example of a processing network/algorithm for enhancing input visual data.

The method substantially as hereinbefore described in relation to FIGS. 1 to 3.

EXAMPLE 31

Apparatus for carrying out the method of any previous example.

EXAMPLE 32

A computer program product comprising software code for carrying out the method of any of examples 1 to 30.

EXAMPLE 33

Apparatus comprising:
at least one processor; and
at least one memory including computer program code which, when executed by the at least one processor, causes the apparatus to perform the method of any one of examples 1 to 30.

EXAMPLE 34

A computer-readable medium having computer-readable code stored thereon, the computer-readable code, when executed by at least one processor, causing the performance of the method of any one of examples 1 to 30.

What is claimed is:

1. A method for enhancing input visual data using an algorithm comprising:
   evaluating gradients of an output of an energy function with respect to the input visual data;
   generating a processing algorithm using the gradients of the output and the input visual data; and
   using the processing algorithm to output enhanced visual data,
   wherein the output of the energy function is a scalar, and
   wherein the enhanced visual data is based on the input visual data.

2. The method of claim 1, wherein the energy function is any of an algorithm, hierarchical algorithm, computation, formula, or subroutine.

3. The method of claim 1, wherein the energy function receives one or more sections of the input visual data.

4. The method of claim 1, wherein the energy function outputs a real valued scalar.

5. The method of claim 1, wherein the energy function comprises a plurality of layers.

6. The method of claim 1, wherein evaluating or calculating the gradients of the output comprises automatic differentiation.

7. The method of claim 1, wherein evaluating or calculating the gradients of the output comprises backpropagation.

8. The method of claim 1, further comprising receiving the input visual data.

9. The method of claim 1, wherein the energy function comprises a plurality of parameters.

10. The method of claim 9, wherein one or more of the plurality of parameters are trainable.

11. The method of claim 1, wherein the processing algorithm calculates a linear combination of the input visual data it receives, and the gradients of the energy function.

12. The method of claim 11, wherein a plurality of parameters are trained via a training algorithm.

13. The method of claim 1, wherein the energy function comprises a plurality of layers, and wherein the layers are any of sequential, recurrent, recursive, branching, or merging.

14. The method of claim 1, wherein the enhanced visual data is fed back into the processing algorithm and processed further in a recurrent fashion.

15. The method of claim 14, wherein the energy function is pre-trained, fine-tuned, or trained using a learned approach.

16. The method of claim 1, wherein the input visual data comprises a plurality of sections.

17. The method of claim 16, wherein the plurality of sections comprises a plurality of low-quality inputs.

18. The method of claim 16, wherein quality can be measured subjectively.

19. An apparatus for enhancing input visual data using an algorithm comprising:
   at least one processor; and
   at least one memory including computer program code which, when executed by the at least one processor, causes the apparatus to:
      evaluate gradients of an output of an energy function with respect to the input visual data;
      generate a processing algorithm using the gradients of the output and the input visual data; and
      use the processing algorithm to output enhanced visual data,
      wherein the output of the energy function is a scalar, and
   wherein the enhanced visual data is based on the input visual data.

20. A non-transitory computer-readable medium having computer-readable code stored thereon, the computer-readable code, when executed by at least one processor, cause the at least one processor to:
   evaluate gradients of an output of an energy function with respect to an input visual data;
   generate a processing algorithm using the gradients of the output and the input visual data; and
   use the processing algorithm to output enhanced visual data,
   wherein the output of the energy function is a scalar, and
   wherein the enhanced visual data is based on the input visual data.

* * * * *